United States Patent
Hellwig

(10) Patent No.: US 6,804,562 B2
(45) Date of Patent: Oct. 12, 2004

(54) METHOD AND APPARATUS FOR OVERLOAD-FREE DRIVING OF AN ACTUATOR

(75) Inventor: Hans-Peter Hellwig, Regenstauf (DE)

(73) Assignee: Siemens Aktiengesellschaft, Munich (DE)

( * ) Notice: Subject to any disclaimer, the term of this patent is extended or adjusted under 35 U.S.C. 154(b) by 384 days.

(21) Appl. No.: 10/012,813

(22) Filed: Oct. 30, 2001

(65) Prior Publication Data

US 2002/0062160 A1 May 23, 2002

(30) Foreign Application Priority Data

Oct. 30, 2000 (DE) .......................................... 100 53 750

(51) Int. Cl.$^7$ .............................................. G05B 11/01
(52) U.S. Cl. ........................... 700/14; 700/33; 700/306; 377/15; 377/16; 377/20; 377/45; 708/672; 702/79; 702/176; 340/825.65; 340/309.4; 388/921; 307/141
(58) Field of Search .............................. 375/236; 377/1, 377/2, 12, 15, 16, 20, 39, 45; 318/603; 307/41, 141; 700/11, 12, 14, 28, 32, 33, 54, 79, 306; 701/49, 114; 702/176, 178, 79; 708/672; 340/540, 635, 679, 657, 658, 825.65, 309.4; 388/921

(56) References Cited

U.S. PATENT DOCUMENTS

| | | | | |
|---|---|---|---|---|
| 3,612,976 A | * | 10/1971 | Tripp | .......................... 318/603 |
| 3,681,780 A | * | 8/1972 | Ross | ........................... 702/74 |
| 4,471,232 A | * | 9/1984 | Peddie et al. | ................. 307/35 |
| 4,487,333 A | * | 12/1984 | Pounder et al. | ............... 222/54 |
| 4,595,188 A | * | 6/1986 | Wiley et al. | ................ 271/4.01 |
| 4,661,754 A | * | 4/1987 | Tajima et al. | ................ 318/696 |
| 4,721,894 A | | 1/1988 | Graber | |
| 4,784,130 A | * | 11/1988 | Kenyon et al. | ......... 128/204.21 |
| RE32,888 E | * | 3/1989 | Kirby et al. | ................ 102/217 |
| 5,765,916 A | * | 6/1998 | Patel | ...................... 297/344.13 |
| 6,107,762 A | * | 8/2000 | Schauer | ....................... 318/245 |
| 6,125,322 A | * | 9/2000 | Bischof et al. | ............. 701/114 |
| 6,131,539 A | * | 10/2000 | Thomas | .................... 123/41.15 |
| 6,408,229 B1 | * | 6/2002 | Loudon et al. | ................. 701/1 |
| 6,571,422 B1 | * | 6/2003 | Gordon et al. | ................ 15/339 |
| 6,719,377 B1 | * | 4/2004 | Zimmermann et al. | .. 303/115.4 |

FOREIGN PATENT DOCUMENTS

| | | |
|---|---|---|
| DE | 32 46 501 C2 | 6/1983 |
| DE | 38 18 722 C2 | 1/1989 |
| DE | 199 40 680 A 1 | 3/2001 |

* cited by examiner

Primary Examiner—Anthony Knight
Assistant Examiner—Crystal J. Barnes
(74) Attorney, Agent, or Firm—Laurence A. Greenberg; Werner H. Stemer; Gregory L. Mayback

(57) ABSTRACT

The invention relates to a method for overload-free driving of an actuator, in which an activation counter is incremented or decremented each time an activation request signal occurs, in which, depending on each occurrence of an activation request signal, a drive signal for the actuator is generated if the counter reading of the activation counter is less than or greater than a predetermined maximum or minimum counter reading, in which the counter reading is in each case decremented or incremented if the time since the last generation of a drive signal or since the deactivation of the drive signal is greater than or equal to a predetermined or predeterminable interval time or if the time since the last decrementing of the activation counter is greater than or equal to the interval time.

24 Claims, 2 Drawing Sheets

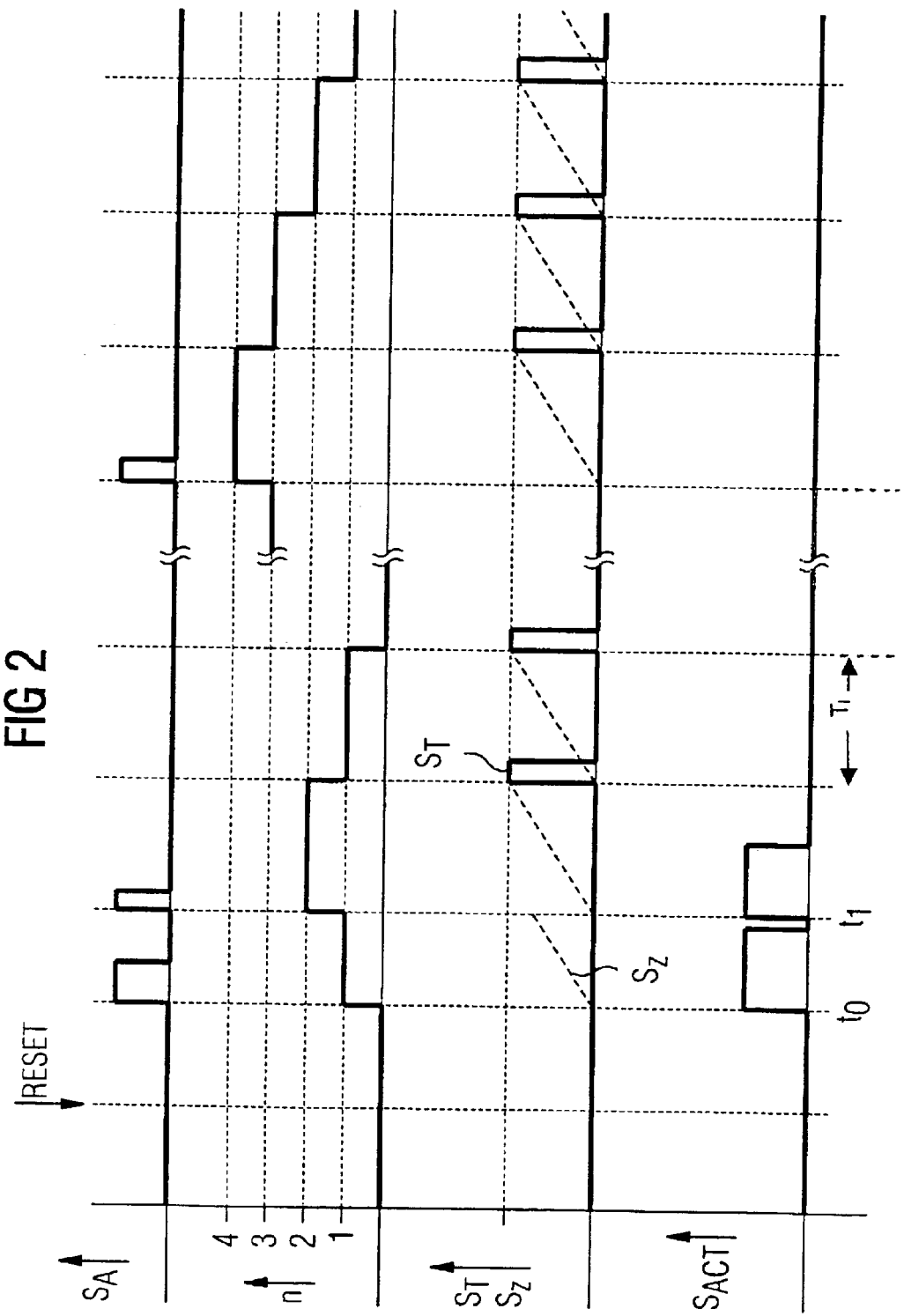

METHOD AND APPARATUS FOR OVERLOAD-FREE DRIVING OF AN ACTUATOR

BACKGROUND OF THE INVENTION

Field of the Invention

The invention relates to a method and an apparatus for overload-free driving of an actuator, for example of an electric motor for the folding function of exterior mirrors of a motor vehicle.

In the context of driving actuators, the problem of protecting the actuator against overload often arises. This is because actuators, for cost reasons, are usually not designed for continuous operation. If the actuator is driven so often that the actual average power produced by the actuator is greater than the rated power of the actuator for a relatively long time (for continuous operation), then there exists the risk that the actuator may be destroyed. The risk of destruction is thereby higher, the greater the extent to which the actuator was underdimensioned.

For overload-free driving of an actuator, it has become known in the prior art, for example from U.S. Pat. No. 4,721,894 (German patent DE 38 18 722 C2), to monitor the temperature or the power actually produced by the actuator and to switch the actuator off as soon as the permissible power or permissible maximum temperature of the actuator is exceeded. However, this requires power sensing or temperature sensors. Therefore, the realization of corresponding apparatuses for overload-free driving of an actuator is often too costly.

Furthermore, it is known to dispense with sensors for power or temperature monitoring of an actuator and merely to count the number of activations, calculated from a first activation, and to necessarily comply with a predetermined pause time after a predetermined maximum number of activations has been reached. This method has the disadvantage that the actuator must be dimensioned with such a (high) power that the maximum possible number of activations can be carried out even when no pause at all is complied with between the individual activations. The pause time likewise has to be fixed at a sufficiently large value for this worst case scenario. The pause time is complied with irrespective of the pauses with which the actuator is driven.

Furthermore, it is known for the actuator to be deactivated after a fixedly predetermined times calculated from a first activation, for a specific fixed pause time. However, in this case, too, the actuator has to be dimensioned such that it can be activated continually, i.e. without an interim pause, within the fixedly predetermined time. The pause time is complied with even when the actuator has only been driven a single time.

SUMMARY OF THE INVENTION

It is accordingly an object of the invention to provide a method and an apparatus for driving an actuator, which overcome the above-mentioned disadvantages of the heretofore-known devices and methods of this general type and which can be implemented in a simple and cost-effective manner, in particular without additional sensors for the actuator and in which unnecessary deactivation of the actuator for an unnecessary length of time is avoided as far as possible.

With the foregoing and other objects in view there is provided, in accordance with the invention, a method of driving an actuator and protecting the actuator against overload, which comprises the following method steps:

generating a drive signal for the actuator until the actuator has completely performed a requested function;

incrementing an activation counter each time an activation request signal is received;

generating a drive signal for the actuator upon receiving an activation request signal only if a counter reading of the activation counter is no more than (less than, or less than or equal to) a predetermined maximum counter reading;

decrementing the counter reading in each case if a time since a last generation of the drive signal or since a deactivation of the drive signal is no less than (greater than, or greater than or equal to) a given interval time, or if a time since a last decrementing of the activation counter is no less than (greater than, or greater than or equal to) the interval time.

In accordance with an alternative embodiment of the invention, the method comprises:

decrementing an activation counter each time an activation request signal is received;

generating a drive signal for the actuator upon receiving an activation request signal only if a counter reading of the activation counter is no less than a predetermined minimum counter reading;

incrementing the counter reading in each case if a time since a last generation of the drive signal or since a deactivation of the drive signal is no less than a given interval time, or if a time since a last incrementing of the activation counter is no less than the interval time.

In other words, each time an activation request signal occurs, a drive signal for the actuator is generated only when the counter reading of the activation counter is less than a predetermined maximum counter reading (or is less than or equal to a predetermined maximum counter reading).

Accordingly, the actuator must be dimensioned such that it can be activated successively, without an interim pause, as often as corresponds to the maximum possible counter reading.

The counter reading is in each case decremented if the time since the last generation (or ending) of a drive signal (which leads to incrementing of the activation counter) is greater than (or greater than or equal to) a predetermined or predeterminable interval time or if the time since the last decrementing of the activation counter is greater than (or greater than or equal to) the interval time. In this case, the interval time should be chosen at least to be greater than the maximum possible activation time of the actuator if the interval time is calculated essentially from the beginning of the activation request signal or the drive signal. Otherwise, this condition is obviated.

In many applications it will be possible to assume that the activation time of the actuator lies at least within a relatively narrow, predetermined temporal range. By way of example, the folding in of an exterior mirror and folding out of an exterior mirror will essentially always require the same amount of time. It is therefore possible, without significant disadvantage, for the interval time to begin with the activation request signal or the drive signal.

What is achieved with the method according to the invention is that, in the event of a plurality of successive activations of the actuator, at time intervals shorter than the predetermined interval time, the activation counter is incremented without any decrementing up to the maximum value and, after the maximum value has been reached, further drive signals for the actuator on account of further activation request signals are suppressed. If activation request signals arrive at time intervals longer than the interval time, then the activation counter is decremented once or a number of times (at most down to the value zero).

This method therefore reacts very flexibly to the frequency of occurrence of activation request signals and the time intervals thereof. Unnecessary pause times do not occur. The actuator is nevertheless reliably protected against overloading.

According to one refinement of the invention, the generation of a drive signal for the actuator can be suppressed, after the maximum counter reading has been reached, for a fixedly predetermined or predeterminable pause time.

In accordance with an added feature of the invention, the generation of a drive signal for the actuator, after the maximum counter reading has been reached, is prevented until the counter reading of the activation counter is less than or equal to a predetermined or predeterminable value. By way of example, the generation of a drive signal can be permitted again only if the value of the activation counter had been decremented down to zero.

According to one refinement of the invention, the interval time is chosen such that the average power of the actuator, in the event of periodic driving with a period corresponding to the interval time [(interval time calculated from the beginning of the drive signal) or, in the event of periodic driving with a period corresponding to the maximum duration of the drive signal plus the interval time (interval time calculated from the end of the drive signal)] essentially corresponds to the maximum permissible average power. This is necessary in order to prevent overloading of the actuator in that steady state in which the activation counter is in each case incremented by an activation request signal (and generation of a drive signal for the actuator) and, immediately after the interval time has elapsed and a corresponding decrementing of the activation counter, an activation request signal arrives again.

The apparatus according to the invention comprises a counter unit, which forms the activation counter, and a counter/timer unit, which generates a signal for decrementing the counter unit at essentially periodic intervals.

The counter/timer unit may have a resettable or programmable counter, the counter reading being set to a predetermined or predeterminable counter reading each time an activation request signal occurs. The effect achieved in this way is that the interval time in each case begins with the arrival of an activation request signal for the actuator.

This is not absolutely necessary, however. Rather, the counter/timer unit can also generate the decrementing signals nonsynchronously with the activation request signals. In this case, however, it is necessary to suppress a signal for decrementing the activation counter during the actual activation time of the actuator.

As already explained above, it is possible to place the starting point of the interval time both at the beginning and at the end of a drive signal for the actuator. If the pause between two successive activation request signals amounts to a multiple of the interval time, then the beginning of a new interval time is defined by each end of the preceding interval time. In this case, the activation counter is decremented with each end of an interval time.

The method according to the invention can be realized in a simple manner by means of a customary microprocessor circuit or a microcontroller in conjunction with a program which processes the method.

An apparatus according to the invention can have the required activation counter unit and a counter/timer unit as hardware. However, these units can likewise be realized as software in conjunction with customary microprocessor circuits or microcontrollers.

Instead of the activation counter being incremented when an activation request signal occurs, and the counter being decremented in longer pauses, it goes without saying that it is also possible for the activation counter to be decremented by activation request signals. In this case, the counter is correspondingly incremented in longer pauses.

With the above and other objects in view there is also provided, in accordance with the invention, in combination with an apparatus for driving an actuator having an input receiving an activation request signal and a drive output for driving the actuator, a computer program product comprising a computer-readable medium having stored thereon program code for executing the above-outlined methods.

Other features which are considered as characteristic for the invention are set forth in the appended claims.

Although the invention is illustrated and described herein as embodied in a method and apparatus for overload-free driving of an actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a schematic illustration of timing diagrams for a plurality of signals of the apparatus in FIG. 1.

DESCRIPTION OF THE PREFERRED EMBODIMENTS

Figure 1:
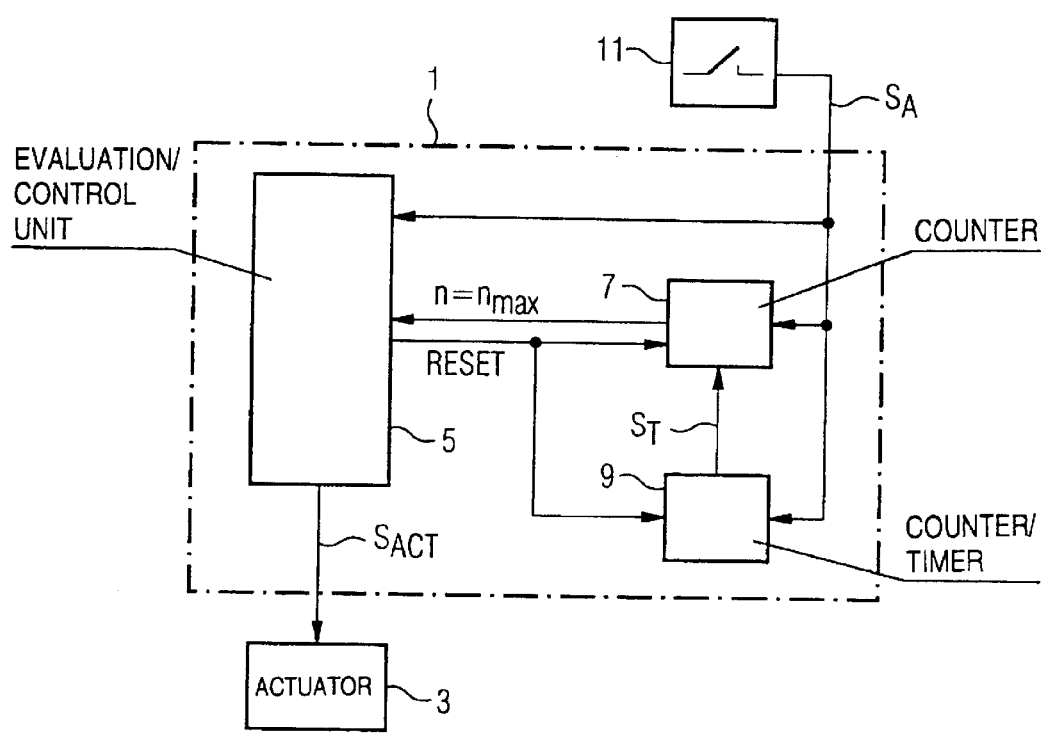
FIG. 1 is a schematic block diagram of an apparatus according to the invention for overload-free driving of an actuator.

Referring now to the figures of the drawing in detail and first, particularly, to FIG. 1 thereof, there is shown an apparatus 1 for overload-free driving of an actuator 3. The apparatus 1 comprises an evaluation and control unit 5 and also an activation counter unit 7 and a counter/timer unit 9.

An activation request signal $S_A$—for example generated by a pushbutton switch 11 in the exemplary embodiment—is in each case fed to the evaluation and control unit 5, the activation counter unit 7 and the counter/timer unit 9. When the pushbutton switch 11 is actuated, a short rectangular-waveform pulse is generated, as illustrated in FIG. 2. The duration of the pulse may depend on the actuation time of the pushbutton switch 11. In an embodiment of the invention, the pushbutton switch 11 may comprise a pulse shaper which ensures that when the pushbutton switch is actuated, a pulse having a constant time duration is generated in each case, in order to avoid undesired retriggering.

The evaluation and control unit 5 is designed in such a way that a drive signal $S_{ACT}$ is generated for the actuator 3, in dependence on the presence of an activation request signal $S_A$, only when the output of the activation counter unit 7 signals a counter reading n which is less than a predetermined maximum counter reading $n_{max}$. For this purpose, the counter unit 7 may be designed in such a way that the information as to whether the maximum counter reading $n_{max}$ has in each case been reached is communicated via the connection between the counter unit 7 and the evaluation and control unit 5. By way of example, each time a pulse of the activation request signal $S_A$ arrives, the evaluation and control unit 5 can interrogate the activation counter unit 7 to determine whether the maximum counter reading $n_{max}$ has been reached. It goes without saying that the counter unit 7 can also generate a signal which signals the presence of a maximum counter reading $n_{max}$ as long as the maximum counter reading is present.

However, the counter unit 7 may also be implemented as a simple counter which is clocked by the signal $S_A$ and whose counter reading is in each case communicated to the evaluation and control unit or interrogated by the latter. In this case, the evaluation/control unit 5 itself carries out the comparison as to whether the present counter reading n is less than the maximum counter reading $n_{max}$ and generates a drive signal $S_{ACT}$ for the actuator 3 only in this case.

The activation counter unit 7 thus always comprises an internal activation counter (not specifically illustrated) which is in each case incremented with each pulse of the activation request signal $S_A$.

Without the presence of the counter/timer unit 9, in the exemplary embodiment illustrated, where $n_{max}=4$ was chosen, the evaluation and control unit 5 would thus generate a respective drive signal $S_{ACT}$ for the actuator 3 at most in response to three pulses of the request signal $S_A$. In this case, in the context of the present invention, it is assumed that the drive signal $S_{ACT}$ is generated by the evaluation and control unit 5 in each case until the actuator 3 has completely performed the function that it has to handle. In this case, it is not absolutely necessary for the drive signal $S_{ACT}$ to be of the same length in each case.

It should be pointed out that the drive signal $S_{ACT}$ can also be generated as a retriggerable signal, in other words if a further pulse of the activation request signal $S_A$ arrives before the end of the time duration of a drive signal that has already been generated, a new drive signal with the desired time duration is generated. The counter unit 7 is incremented in this case, too.

If the evaluation and control unit 5 ascertains that the predetermined maximum counter reading $n_{max}$ of the activation counter unit 7 has been reached, then a drive signal $S_{ACT}$ is no longer generated in the event of further pulses of the activation request signal $S_A$.

The counter/timer unit 9 is designed to generate a periodic pulse train (in pauses between two activation request signals) at its output connected to the activation counter unit 7. The period duration of the pulse train is greater than the maximum time duration of a drive signal $S_{ACT}$ generated by the evaluation and control unit 5 and the interval time beginning with the starting instant of the activation request signal or of the drive signal.

In the exemplary embodiment of the invention as illustrated in FIG. 1, the pulses of the activation request signal $S_A$ are also fed to the counter/timer unit 9. Each pulse of the signal $S_A$ triggers a resetting of the counter/timer unit. For this purpose, the counter/timer unit may be designed as a counter to which a constant clock signal is applied and which is set to the value zero or another predetermined value with each pulse of the signal $S_A$. The output signal may then be realized by the overflow signal of the counter, with the result that after the resetting of the counter/timer unit 9 by a pulse of the signal $S_A$, a pulse of the interval signal $S_T$ fed to the activation counter unit 7 is generated for the first time if the counter of the counter/timer unit 9 has reached its maximum value and, accordingly, generates an overflow signal in the form of a pulse of the signal $S_T$. Afterward, the counter of the counter/timer unit 9 starts to count up again from its minimum value and generates further pulses of the signal $S_T$ in each case if an overflow has been reached again. Therefore, a periodic interval signal $S_T$ is generated until a renewed pulse of the activation request signal $S_A$ triggers a resetting of the counter/timer unit 9.

It goes without saying, however, that the counter/timer unit 9 can also be realized in a different manner than by a clocked counter.

The output signal $S_T$ of the counter/timer unit 9 is fed to a decrementing input of the activation counter unit 7. The effect achieved in this way is that each pulse of the signal $S_A$ increments the present counter reading n of the counter unit 7 (for example by the value 1, i.e. n→n+1) and each pulse of the signal $S_T$ decrements the present counter reading n of the counter unit 7 (for example by 1, i.e. n→n−1).

In this way, account is taken of the fact that longer pauses between two pulses of the activation request signal $S_A$ effect a recovery of the actuator after one or more previously effected activations.

The functionality of the apparatus illustrated in FIG. 1 will now be explained in more detail below with reference to the signal diagrams in FIG. 2:

At a specific instant, for example when the entire apparatus 1 is switched on, the evaluation and control unit 5 firstly generates a reset signal for the activation counter unit 7 and the counter/timer unit 9, in order to produce a defined initial state for these units.

A first pulse of the activation request signal $S_A$ is generated by means of the pushbutton switch 11 at an instant $t_0$. Then the present counter reading of the counter unit 7 is incremented from the initial state (in this case this is the counter reading equal to zero) to the value n=1. The counter/timer unit 9 is reset at the same time. For this purpose, in the case of the signal $S_T$ illustrated in FIG. 2, it is assumed that an internal counter of the counter/timer unit 9 is set to the value zero. The present counter reading of the internal counter of the counter/timer unit 9 is represented by broken lines as signal $S_z$ in FIG. 2.

The situation illustrated in FIG. 2 shows that, at an instant $t_1$, a further pulse of the activation request signal $S_A$ is generated by means of the pushbutton switch 11 before the present counter reading of the internal counter of the counter/timer unit 9 reaches its maximum value and an overflow signal is generated. Consequently, the second pulse of the signal $S_A$ leads to further incrementing of the counter unit 7 to the value n=2. At the same time, the internal counter of the counter/timer unit 9 is again reset to the value zero.

It can therefore easily be seen that when the generation of pulses of the signal $S_A$ is continued in each case at instants at which the counter/timer unit has not yet generated an overflow pulse, the counter unit 7 is incremented until the counter reading $n_{max}$ is reached. As soon as the counter reading $n_{max}$ is reached, the evaluation and control unit 5 no longer generates a drive signal $S_{ACT}$, despite the presence of a pulse of the activation request signal $S_A$.

In the case of the procedure illustrated in FIG. 2, in which the interval time $T_I$, i.e. the period duration of the periodically generated signal $S_T$, begins with the beginning (with the rising edge) of the activation request signal $S_A$, it is absolutely necessary, if further measures are not provided, to choose the interval time $T_I$ to be greater than the maximum duration of a pulse of the drive signal $S_{ACT}$. If, in this embodiment, the interval time is nevertheless intended to be chosen to be less than the maximum duration of an activation of the actuator 3, then care must be taken to prevent a decrementing signal from being generated at the output of the outer/timer unit 9 as long as a drive signal is generated. This can be achieved in a simple manner by means of corresponding logic gates which logically combine the drive signal $S_{ACT}$ and the interval signal $S_T$.

It goes without saying, however, that it is likewise possible for a resetting of the counter/timer unit 9 to be performed not by way of the signal $S_A$ but with the end (for example the falling edge) of the drive signal $S_{ACT}$ generated last, and for care to be taken to ensure that no decrementing signal passes to the counter/timer unit 9 during the generation of a drive signal. This can again be achieved by means of a logic circuit which logically combines the drive signal $S_{ACT}$ and the signal $S_T$. The effect achieved as a result of this is that a periodic pulse train is generated at the output of the counter/timer unit 9 only in the pauses between two successive pulses of the activation request signal $S_A$.

It would be possible, moreover, to design a counter/timer unit in the form of a simple oscillator which generates a periodic, for example rectangular-waveform, signal without the output signal of the counter/timer unit 9 being synchronized with the activation request signal $S_A$ or the drive signal $S_{ACT}$. In this case, too, care must be taken to ensure that corresponding pulses of the signal $S_T$ are applied to the decrementing input of the counter unit 7 only when a drive signal $S_{ACT}$ is not being generated at the same time. However, this can likewise be effected using simple gate circuits.

If the maximum counter reading $n_{max}$ has been reached, then the evaluation and control unit 5 suppresses the generation of a drive signal $S_T$. For this purpose, the evaluation and control unit 5 can know a predetermined pause time $T_P$ or determine it, for example from the history of the temporal generation of drive signals for the actuator 3, the generation of a drive signal being suppressed throughout the pause time irrespective of the possible presence of an activation request signal $S_A$. The pause time may begin for example with the beginning of that pulse of the activation request signal $S_A$ with which the counter unit 7 is incremented to the maximum value $n=n_{max}$.

According to another embodiment, instead of a fixedly predetermined pause time $P_T$, the generation of an activation signal can be suppressed, after the maximum counter reading $n_{max}$ has been reached, until, through the generation of a periodic interval signal $S_T$ by the counter/timer unit 9, the counter unit 7 has been decremented to a counter reading which is fixedly predetermined or can be determined by the evaluation and control unit depending on the history.

The apparatus according to the invention, or the method on which it is based, has the advantage that it can be adapted to present requirements, in particular the given rated power of the actuator 3, the degree of under-dimensioning thereof and the duration of an activation of the actuator 3, using just two parameters, namely the maximum counter reading $n_{max}$ of the counter unit 7 and the period duration $T_I$ of the signal $S_T$ generated by the counter/timer unit 9. Unnecessary reactivation times of the actuator 3 are avoided.

The apparatus can be implemented in a simple manner by means of a customary microprocessor circuit. In this case the activation counter unit 7 and the counter/timer unit 9, just like the evaluation and control unit 5, can also be realized in the form of a customary microprocessor circuit with an associated program.

Instead of the above-described incrementing of the activation counter unit 7 each time an activation request signal occurs, it goes without saying that decrementing can also be effected. In this case, the counter unit 7 must then be incremented in the (sufficiently long) pauses. The maximum counter reading $n_{max}$ is then replaced by a minimum counter reading $n_{min}$. In both cases, the counter reading may vary between a minimum and maximum limit value. In the simplest case, the minimum counter reading is equal to zero.

I claim:

1. A method of driving an actuator and protecting the actuator against overload, which comprises the following method steps:

generating a drive signal for the actuator until the actuator has completely performed a requested function;

incrementing an activation counter each time an activation request signal is received;

generating a drive signal for the actuator upon receiving an activation request signal only if a counter reading of the activation counter is no more than a predetermined maximum counter reading;

decrementing the counter reading in each case if a time since a last generation of the drive signal or since a deactivation of the drive signal is no less than a given interval time, or if a time since a last decrementing of the activation counter is no less than the interval time.

2. The method according to claim 1, which comprises generating the drive signal for the actuator only if the counter reading is less than, or less than or equal to, the maximum counter reading.

3. The method according to claim 1, which comprises decrementing the counter reading if a time since a last generation of the drive signal or since a deactivation of the drive signal is greater than, or greater than or equal to, the interval time.

4. The method according to claim 1, which comprises decrementing the counter reading if a time since a last decrementing of the activation counter is greater than, or greater than or equal to, the interval time.

5. The method according to claim 1, which comprises preventing a generation of the drive signal for a given pause time after the maximum counter reading has been reached.

6. The method according to claim 5, which comprises, after the maximum counter reading has been reached, preventing the generation of a drive signal until the counter reading of the activation signal is less than or equal to a given value.

7. The method according to claim 6, which comprises setting the given value equal to zero.

8. The method according to claim 1, which comprises choosing the interval time such that an average power of the actuator, in an event of periodic driving with the period, substantially corresponds to a maximum permissible average power of the actuator.

9. In an apparatus for driving an actuator having an input receiving an activation request signal and a drive output for driving the actuator, a computer program product comprising a computer-readable medium having stored thereon program code for executing the method according to claim 1.

10. A method of driving an actuator and protecting the actuator against overload, which comprises the following method steps:

generating a drive signal for the actuator until the actuator has completely performed a requested function;

decrementing an activation counter each time an activation request signal is received;

generating a drive signal for the actuator upon receiving an activation request signal only if a counter reading of the activation counter is no less than a predetermined minimum counter reading;

incrementing the counter reading in each case if a time since a last generation of the drive signal or since a deactivation of the drive signal is no less than a given interval time, or if a time since a last incrementing of the activation counter is no less than the interval time.

11. The method according to claim 10, which comprises incrementing the counter reading if a time since a last generation of the drive signal or since a deactivation of the drive signal is greater than, or greater than or equal to, the interval time.

12. The method according to claim 10, which comprises incrementing the counter reading if a time since a last incrementing of the activation counter is greater than, or greater than or equal to, the interval time.

13. The method according to claim 10, which comprises preventing a generation of the drive signal for a given pause time after the minimum counter reading has been reached.

14. The method according to claim 13, which comprises, after the minimum counter reading has been reached, preventing the generation of the drive signal until the counter reading of the activation counter is greater than or equal to a given value.

15. The method according to claim 10, which comprises choosing the interval time such that an average power of the actuator, in an event of periodic driving with the period, substantially corresponds to a maximum permissible average power of the actuator.

16. The method according to claim 10, which comprises generating the drive signal for the actuator only if the counter reading is greater than, or greater than or equal to, the minimum counter reading.

17. In an apparatuses for driving an actuator having an input receiving an activation request signal and a drive output for driving the actuator, a computer program product comprising a computer-readable medium having stored thereon program code for executing the method according to claim 10.

18. An apparatus for driving an actuator and protecting the actuator against overload, wherein a drive signal is generated for the actuator until the actuator has completely performed a requested function, the apparatus comprising:

an activation counter unit having an incrementing input and a decrementing input, said decrementing input receiving an activation request signal and said activation counter unit decrementing a counter reading each time upon receiving the activation request signal;

a counter/timer unit connected to said incrementing input of said activation counter unit, said counter/timer unit outputting a substantially periodic output signal to said incrementing input of said counter unit during pauses of the activation request signal or of the drive signal, the output signal of said counter/timer unit having a given period duration;

an evaluation and control unit connected to said activation counter unit, said evaluation and control unit having a drive output connected to the actuator and an input connected to receive the activation request signal;

said evaluation and control unit, when an activation request signal is present, generating a drive signal for the actuator only when the counter reading of said activation counter unit is no less than a maximum counter reading.

19. An apparatus for driving an actuator and protecting the actuator against overload, wherein a drive signal is generated for the actuator until the actuator has completely performed a requested function, the apparatus comprising:

an activation counter unit having an incrementing input and a decrementing input, said incrementing input receiving an activation request signal and said activation counter unit incrementing a counter reading each time upon receiving the activation request signal;

a counter/timer unit connected to said decrementing input of said activation counter unit, said counter/timer unit outputting a substantially periodic output signal to said decrementing input of said counter unit during pauses of the activation request signal or of the drive signal, the output signal of said counter/timer unit having a given period duration;

an evaluation and control unit connected to said activation counter unit, said evaluation and control unit having a drive output connected to the actuator and an input connected to receive the activation request signal;

said evaluation and control unit, when an activation request signal is present, generating a drive signal for the actuator only when the counter reading of said activation counter unit is no more than a maximum counter reading.

20. The apparatus according to claim 19 implemented as a microprocessor circuit and a program simulating at least one of said activation counter unit and said timer/counter unit, and programmed to execute the following program steps:

generating a drive signal for the actuator until the actuator has completely performed a requested function, and thereby, incrementing an activation counter each time an activation request signal is received;

generating a drive signal for the actuator upon receiving an activation request signal only if a counter reading of the activation counter is no more than a predetermined maximum counter reading;

decrementing the counter reading in each case if a time since a last generation of the drive signal or since a deactivation of the drive signal is no less than a given interval time, or if a time since a last decrementing of the activation counter is no less than the interval time.

21. The apparatus according to claim 20, which further comprises a computer program product comprising a computer-readable medium containing the program code.

22. The apparatus according to claim 21, wherein said counter/timer unit comprises a counter, and a counter reading of said counter is set to a predetermined or predeterminable counter reading each time the activation request signal is present.

23. The apparatus according to claim 21 implemented as a microprocessor circuit and a program simulating at least one of said activation counter unit and said timer/counter unit, and programmed to execute the following program code steps:

generating a drive signal for the actuator until the actuator has completely performed a requested function, and thereby, decrementing an activation counter each time an activation request signal is received;

generating a drive signal for the actuator upon receiving an activation request signal only if a counter reading of the activation counter is no less than a predetermined minimum counter reading;

incrementing the counter reading in each case if a time since a last generation of the drive signal or since a deactivation of the drive signal is no less than a given interval time, or if a time since a last incrementing of the activation counter is no less than the interval time.

24. The apparatus according to claim 23, which further comprises a computer program product comprising a computer-readable medium containing the program code.

* * * * *